(No Model.)
J. L. JOHNASON.
CUTTER HEAD FOR WOODWORKING MACHINES.
No. 545,654. Patented Sept. 3, 1895.
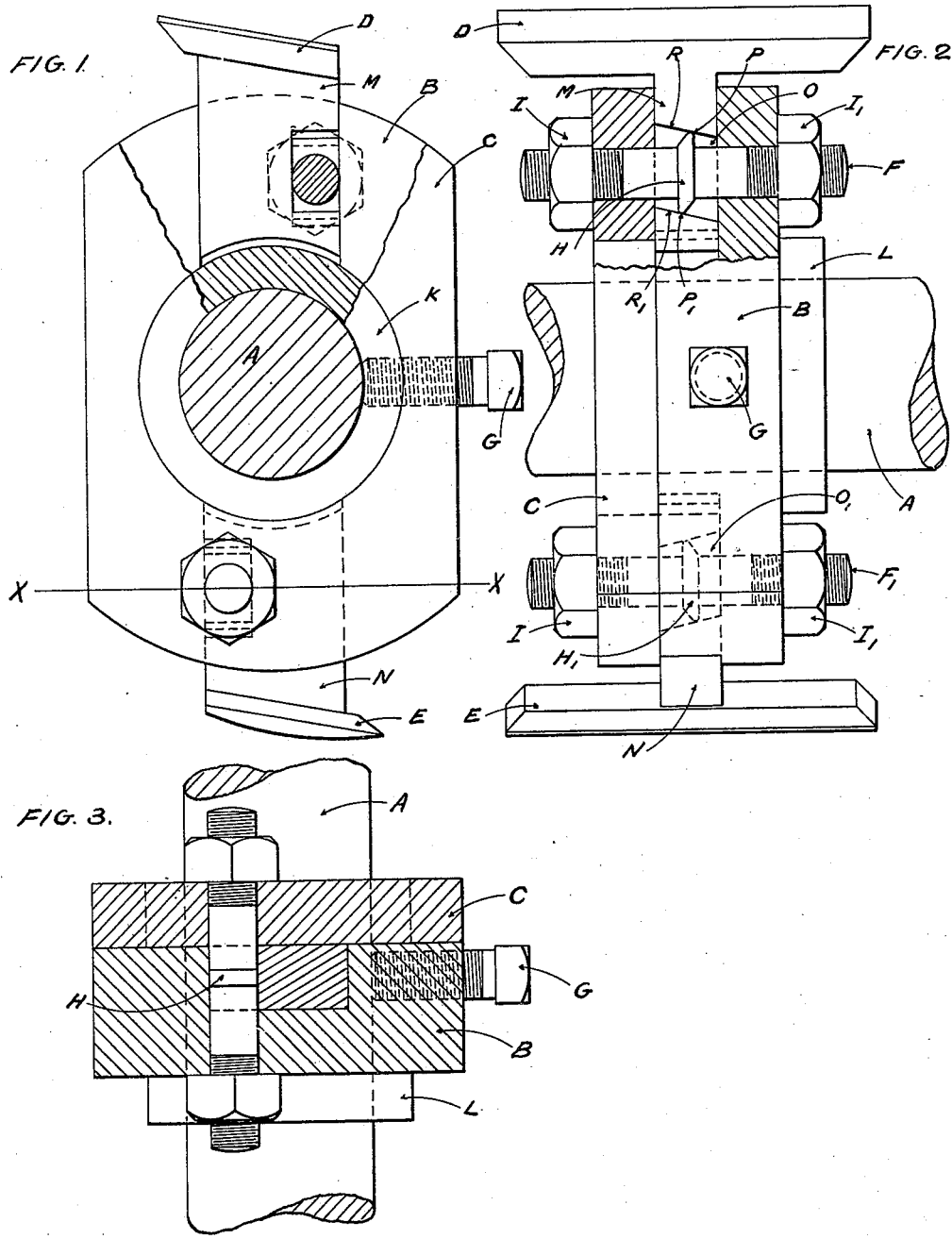
WITNESSES
Mary L. Raymond
Walter G. Van Slyck
John L. Johnason
INVENTOR
By
Clark and Raab
ATTORNEYS.

UNITED STATES PATENT OFFICE.

JOHN L. JOHNASON, OF MARQUETTE, MICHIGAN.

CUTTER-HEAD FOR WOODWORKING-MACHINES.

SPECIFICATION forming part of Letters Patent No. 545,654, dated September 3, 1895.

Application filed January 22, 1895. Serial No. 535,828. (No model.)

*To all whom it may concern:*

Be it known that I, JOHN L. JOHNASON, of Marquette, county of Marquette, and State of Michigan, have invented a new, novel, and Improved Cutter-Head to be Used in Connection with Woodworking-Machines, of which the following is a specification.

My invention has for its object the production of a cutter-head that can be used for making wood moldings, either across or with the grain of the wood, on any woodworking-machine which is provided with an arbor of suitable size to operate my invention, and is an improvement over any cutter-head now in use of which I have any knowledge.

Figure 1 is a plan view of my invention with a piece of the clamping-plate removed so as to show the shank of the cutter. Fig. 2 is a side view of my invention with a piece removed so as to show the adjusting-bolt. Fig. 3 is a section of Fig. 1 on line X X.

A is a section of an arbor of suitable size, upon which the disk B fits and is held firmly in position by means of set-screw G. This disk B is on either side provided with hubs L and K in order to give it a good bearing against the arbor. The disk B is also provided with grooves, in which the shank N of the cutter E and the shank M of the counterbalance D, respectively, fit and can move back and forth.

C is a clamping-plate, which fits around hub K and serves to keep the cutters in place. It also acts as a guide for one end of the adjusting-bolts F and F', by which it is held in position.

E is the cutter itself, the edge of which may have any shape desired.

D is a dummy of the same weight and similar in shape to the cutter E, and serves to counterbalance the cutter E, which is necessary in order to make the fast-revolving cutter-head run even and without jerks.

The shank N of the cutter and the shank M of the dummy are each provided with a slanting slot O and O'. This slot or opening is cut in one edge of the shank and is rectangular in shape.

F and F' are bolts, which are threaded at both ends and furnished with nuts I and I'. These bolts are each in the middle provided with a rectangular disk H and H'. These disks H and H' are made to fit into the slots O and O', those edges of the disks H and H' which bear against the slanting sides of the slot O and O' being tapered down and rounded off, so as to slide easy and with as little wear as possible. When the bolts F and F', by means of the nuts I and I', are moved back and forth by means of this slanting slot and the bolt or the disk which fits well in the slot, the cutter is firmly held in position, and by loosening the nut on one side and tightening the one on the other side the bolt will move from one side to the other and the disk with it, making the cutter move in or out. For instance, if the nut I is loosened and the nut I' is tightened the bolt F and disk H will move on a straight line from left to right and the edge P of the disk H which bears against the slanting side R of the slot O in shank M will force the shank M outward. By loosening nut I' and tightening nut I the bolt with disk will move from right to left on a straight line and the edge P of the disk which bears against the slanting side R of the slot O will force the shank M inward.

The advantages of having a cutter-head constructed as I have described are, first, that it can be manufactured at a small cost; second, by use of the angular slot in the shank of the cutter and the bolts I and I' provided with a disk and also the use of the clamping-plate C the cutters can be easily adjusted and are held from moving either out or in, and when the nuts on the bolts are firmly set the clamping-plate C holds the shank of the knife firmly against the disk B; third, my invention is so simple in its construction that it can be used on any ordinary molding-machine or saw-arbor and can also be used on an upright shaper.

Having thus described my invention, what I claim is—

In a cutter head, the combination with disk B, provided with hubs L and K, disk H and H', with edges P and P' held in position by clamping-plate C, by means of bolts F and F', and nuts I and I'; disk B being provided with grooves to accommodate shank N of cutter E, and with grooves to accommodate shank M of counterbalance D; together with cutter blade in which diagonal slots O, with edges R and R' are located; said mechanism being adjusted to arbor A by set screw G for use; all substantially as shown and described.

Dated January 17, 1895.

JOHN L. JOHNASON.

In presence of—
MARY L. RAYMOND,
WALTER G. VAN SLYCK.